United States Patent [19]

Ippolito

[11] 4,392,531
[45] Jul. 12, 1983

[54] EARTH STORAGE STRUCTURAL ENERGY SYSTEM AND PROCESS FOR CONSTRUCTING A THERMAL STORAGE WELL

[76] Inventor: Joe J. Ippolito, 13110 Lamplight Village Ave., Austin, Tex. 78758

[21] Appl. No.: 309,910

[22] Filed: Oct. 9, 1981

[51] Int. Cl.³ .................... E21B 33/138; E21B 41/00; F28D 15/00; F28F 21/00
[52] U.S. Cl. .................................. 166/278; 165/45; 166/51; 166/250
[58] Field of Search .................... 165/45, 40; 166/51, 166/278, 250, 245, 378, 380; 126/271.1, 400, 436

[56] References Cited

U.S. PATENT DOCUMENTS

| Re. 26,387 | 5/1968 | Balch | 165/40 |
|---|---|---|---|
| 2,018,283 | 10/1935 | Schweitzer et al. | 166/278 |
| 2,198,573 | 4/1940 | Davis et al. | 166/278 |
| 2,461,449 | 2/1949 | Smith et al. | 165/45 X |
| 2,584,573 | 2/1952 | Gay . | |
| 3,339,629 | 9/1967 | Hervey | 165/45 |
| 3,498,380 | 3/1970 | Sparlin et al. | 166/278 |
| 4,008,709 | 2/1977 | Jardine | 165/45 X |
| 4,030,549 | 6/1977 | Bouck | 165/45 X |
| 4,050,509 | 9/1977 | Bienert et al. | 165/45 |
| 4,054,176 | 10/1977 | Van Huisen | 165/45 |
| 4,094,356 | 6/1978 | Ash et al. | 165/45 X |
| 4,138,995 | 2/1979 | Yuan | 126/271 |
| 4,142,576 | 3/1979 | Perry et al. | 165/45 |
| 4,205,718 | 6/1980 | Balch | 165/45 |
| 4,220,202 | 9/1980 | Aladiev et al. | 165/45 X |
| 4,286,574 | 9/1981 | Vrolyk | 165/45 X |

OTHER PUBLICATIONS

Bose, J. E., "Design and Field Testing of Solar Assisted Earth Coils", Oklahoma State Univ., Aug. 1, 1978 to Sep. 1, 1978, EM-7805-01-4257, pp. 246-249.
Gatlin, J. C., "Sand Exclusion Problems", *Petroleum Engineering—Drilling and Well Construction*, Prentice-Hall, (1960), pp. 314, 315.

*Primary Examiner*—Stephen J. Novosad
*Attorney, Agent, or Firm*—Paul D. Supnik

[57] ABSTRACT

A geothermal space conditioning and water heating system for a building structure comprises a battery of serially coupled thermal storage wells. Each well includes a dual concentric thermal conduction tube having an external circumference and an integrated earth interface and substantially moisture impervious clay platelet transition surrounding and at least double the tube circumference. The thermal storage battery has a cold port and a hot port maintained at a temperature greater than the cold port. A space conditioning arrangement is provided in which thermal transport fluid passes through a fan-driven radiator. A reversible heat pump has a radiator conditioned air coupled first heat exchanger and a downstream radiator fluid coupled second heat exchanger. A second heat pump has a first heat exchanger in thermal communication with a hot port coupled hot water heater and a cold port coupled second heat exchanger. A transient storage tank provides a time averaged uniform transport fluid temperature. Valving allows reversal of fluid from the hot and cold ports to and from the transient storage tank and the space conditioning arrangement as determined by multiple temperature sensors determining output states of a controller. The geothermal storage wells are established by circulating a mud in a well to stabilize the hole, running a conduit in the well and thereafter reverse-circulating a sand/gravel slurry through the conduit thereby packing the region between the conducting tube and the earth interface.

40 Claims, 18 Drawing Figures

LINE SOURCE

Fig. 6.

CENTERED POINT SOURCE

Fig. 7.

UNCENTERED POINT SOURCE

| | UNIT SET FOR HEATING | |
|---|---|---|
| ITEM | FLOW CONDITIONS | SPECIFICATIONS |
| FAN | ON | $T_c^* > T_c$ |
| H.P. #1 | ON | $T_{min}^* > T_F - T_c$ |
| $V_1$ | BY PASS | $T_c^* > T_F$ |
| P #1 | ON | FAN ON |
| $V_2$ | ACBD | ALWAYS |
| $V_3$ | BY PASS TANK | $T_F^* > T_c - T_F$ |
| $V_4$ | TO COLLECTOR | $T_4 > T_F$ |
| P #2 | ON | $T_2 > T_1$ or Hp #2 ON |
| HP #2 | ON | $T_3^* > T_3$ |

Fig. 15.

| | UNIT SET FOR COOLING | |
|---|---|---|
| ITEM | FLOW CONDITION | SPECIFICATIONS |
| FAN | ON | $T_c^* < T_c$ |
| H.P. #1 | ON (REVERSE CYCLE) | $T_{min}^* > T_c - T_F$ |
| $V_1$ | BY PASS | $T_c^* < T_F$ |
| P #1 (N.C.) | ON | FAN ON |
| $V_2$ | ABCD | ALWAYS |
| $V_3$ | BY PASS TANK | $T_F^* > T_F - T_c$ |
| $V_4$ (N.C.) | TO COLLECTOR | $T_4 > T_F$ |
| P #2 | ON | $T_2 > T_1$ or H.P. #2 ON |
| (N.C.) HP #2 | ON | $T_3^* > T_3$ |

EARTH STORAGE STRUCTURAL ENERGY SYSTEM AND PROCESS FOR CONSTRUCTING A THERMAL STORAGE WELL

BACKGROUND OF THE INVENTION

1. Field of the Invention

This invention relates to residential and commercial heating and cooling systems. More particularly, the invention relates to systems ultilizing geothermal well energy storage.

2. Description of the Prior Art

In the past, earth coupled heat pump systems have proved technically successful, but economically unattractive, as a result of high initial capital requirements and operating costs. Typical systems have traditionally been made up of buried arrays of pipes and some using standard wells. Buried array systems have had limited free surface area and limited access for repair. Both standard type wells and buried array systems have encountered problems with low conductivity in dry soil and reduced transport capacitance following several heating and cooling cycles. It has been demonstrated that earth coupled systems where high ground water exists have functioned better when withdrawing energy from the ground than when storing thermal energy.

Earth coupled systems have been effective in collecting heat from areas with high ground water and inducing freezing around the pipe. This has insured no free space between pipe and ground, and therefore allows conduction as opposed to radiation being the thermal transport mechanism. Attempts to use the earth as a heat sink in warmer environments have been less successful due to drying of the rock around the pipe with the associated reduction in thermal conductivity and the void areas where the pipe has lost physical contact with ground. This is usually introduced by the constant expansion and contraction of pipe with heating and cooling. The temperature changes produce these gaps through the expansion of the pipe, compaction of ground, followed by contraction of the pipe with cooling. If this volume contains only air then thermal transport is very small. While there has been the use of a drip source to attempt the moistening of the surroundings, most systems have been limited to using the earth as a heat source only and therefore increasing the required surface area several orders of magnitude.

SUMMARY OF THE INVENTION

A structural energy system in accordance with this invention generally comprises an earth storage array having a first and second ports coupled to a space conditioning system for the structure. The space conditioning system includes a heat pump and radiator for reinforcing the effectiveness of the heat pump by reducing the temperature differential over which the heat pump operates, in heating and cooling modes, and by appropriately rechanneling relatively warm or cool heat transport fluid to the appropriate hot or cold ports of the earth storage array.

The earth storage array, in accordance with this invention comprises an effectively elongated storage well arrangement. The array is coupled to the system in such a manner as to maintain a unidirectional temperature gradient between the ports, so that the first port is always at a warmer temperature than the second port.

Each well in accordance with the invention comprise a central thermal transfer conduit and a substantially moisture impervious clay platelet transition surrounding the central thermal conduit. The ratio of the surface area of the clay platelet transition to the central thermal conduit surface area is at least about two to one, thereby enhancing the effective heat transfer by improving conduction into the earth.

In a more specific example, the warmer port is coupled to a domestic water supply preheater and a water heater, and a heat pump coupled between the hot water heater and the cool port returns heat pump coolness to the wells.

Additional features in accordance with the invention include concentric conduit within each well for circulating a thermal transfer fluid. A water source coupled slotted pipe adjacent outer conduit in each well maintains moisture within the wells. Centralizers support the thermal transfer conduit centrally within the wells. The wells may be disposed in a line source array, or point source arrays. Preferably, the wells are at a high angle for significant thermal interchange with the earth.

Other features include a control valve for redirecting the porting of hot and cold fluid from the array. Valving is provided for bypassing hot port originating thermal transport fluid to a transit storage tank, for directing and bypassing a secondary heat exchanger or solar collector, and for bypassing the radiator.

A method for drilling wells in according to this invention generally comprise the steps of drilling a well to a well depth, circulating a mud to stabilize the hole and establish a thick filter cake and a rock face transition, and running an outer thermal conduit in the hole. A sand/gravel mixture is packed by circulation of a slurry between the filter cake and the outer thermal conduit. Additional steps in accordance with the method include running a slotted pipe in the hole. Pumps are coupled to access ports to pump water and mud through the well. The filter cake transition is built up by reverse circulating drilling mud down the outside of the thermal transfer conduit and up through the center of the conduit.

A different example of a method in accordance with this invention involves the running of a second smaller tube into the well outside of the outer tube. The method includes pumping a sand/gravel slurry down the well through the small diameter tube and allowing the fluid to return through the access ports.

BRIEF DESCRIPTION OF THE DRAWINGS

The nature of the invention described herein may be best understood and appreciated by the following description taken in connection with the accompanying drawings in which.

DETAILED DESCRIPTION

Figure 1:
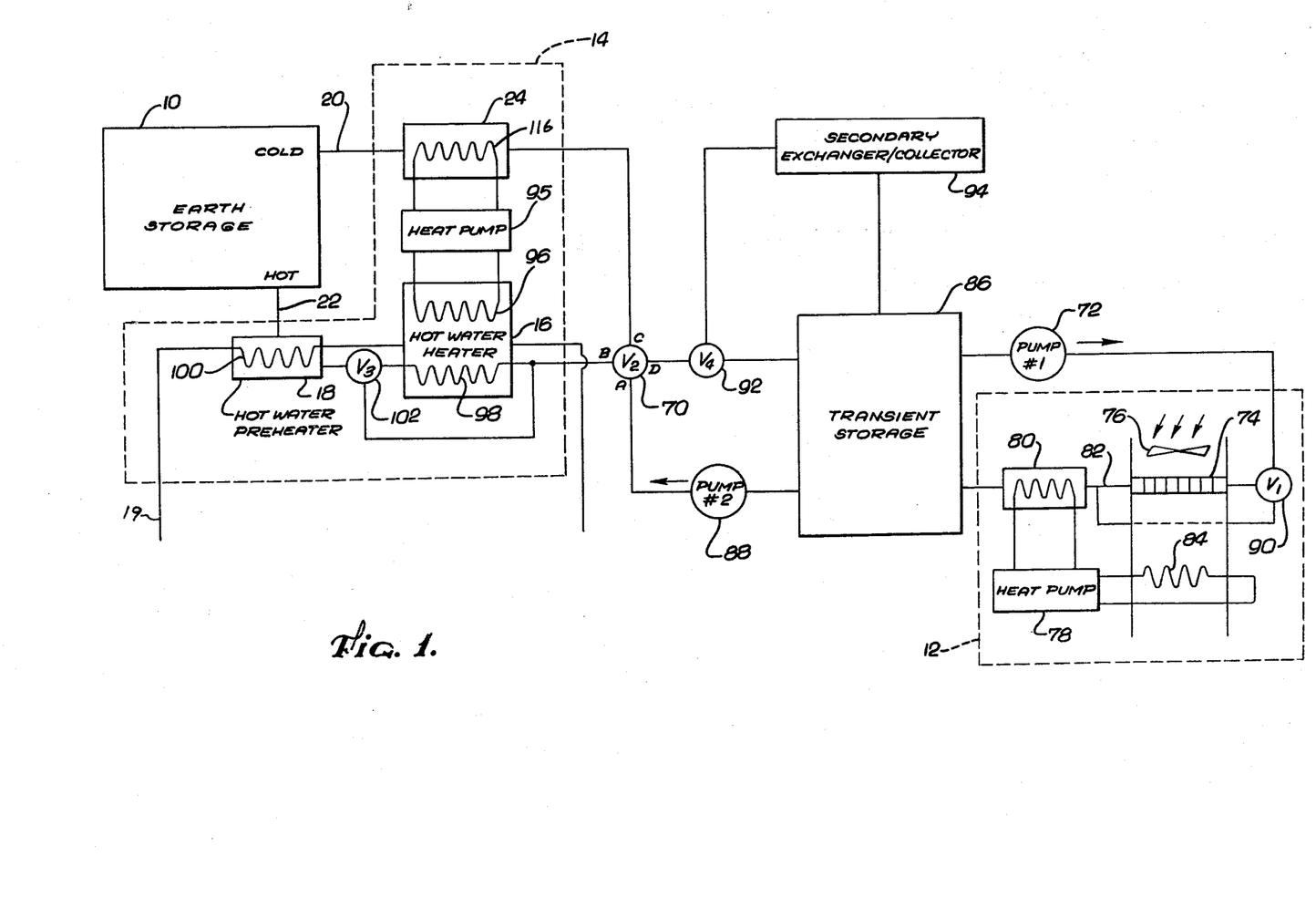
FIG. 1 is a diagrammatic view of an example of a structural energy system in accordance with this invention.

With particular reference to FIG. 1, an example of a structural energy system in accordance with this invention generally comprises an earth storage arrangement 10, a space conditioning arrangement 12 and a hot water heating arrangement 14. The earth storage arrangement 10, space conditioning arrangement 12 and the hot water heating arrangement 14 are coupled through a pumping and valving arrangement as will be described in greater detail, for selectively directing thermal transport fluid through the system. Note that additional examples of systems in accordance with this invention are diagrammatically depicted in FIGS. 9 and 10. The system depicted in FIG. 1 utilizes a hot water heater 16 coupled to a hot water preheater 18 for raising the temperature of water entering the system from a domestic water source 19.

The earth storage unit has a cold port 20 and a hot port 22. A heat exchanger 24 is coupled to thermally communicate with the cold port 20, and the hot port 22 is coupled to thermally communicate with the hot water preheater 18.

The earth storage unit 10 is coupled to the system so as to enhance the temperature differential existing at any point in time between the cold port 20 and the hot port 22. At any point in time, the temperature at the cold port 20 is colder than the temperature at the hot port 22, as will be explained below. In cooling modes, heat is generally supplied to the hot port 22 for storage and coolness may be returned from the cold port 20. The building structure may require at any point in time relatively cooler thermal exchange or relatively warmer thermal exchange and the system provides for obtaining this on demand.

Figure 2:
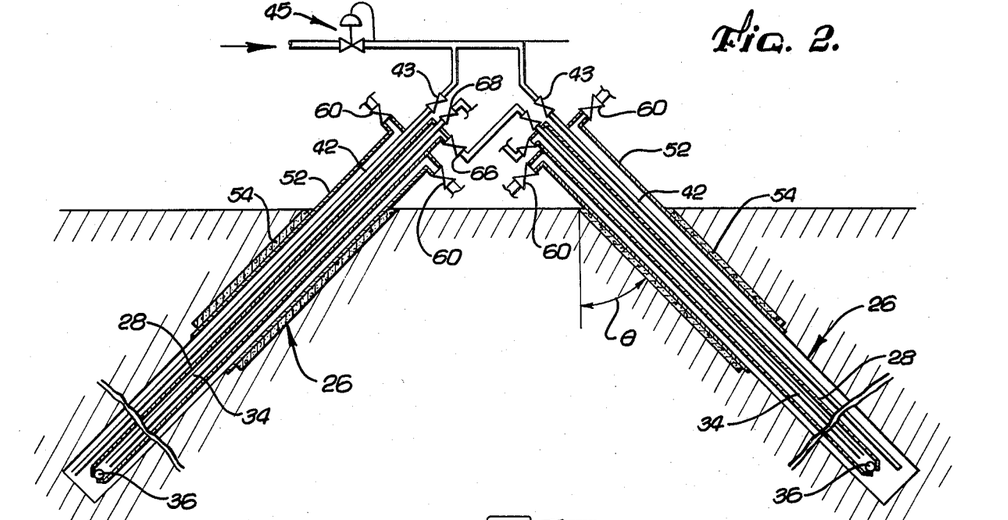
FIG. 2 is a cross-sectional view with portions exposed and portions removed of an example of a well array in accordance with this invention.
Figure 3:
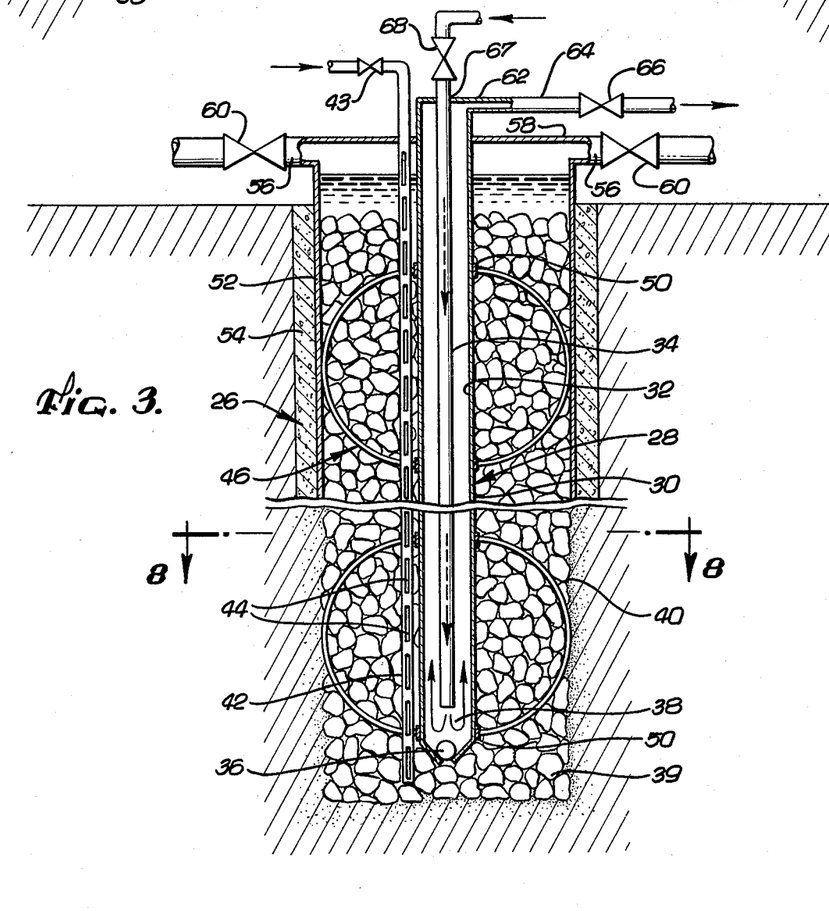
FIG. 3 is a detailed cross-sectional view of a single well of a well array in accordance with this invention with portions exposed and portions removed.
Figure 4:
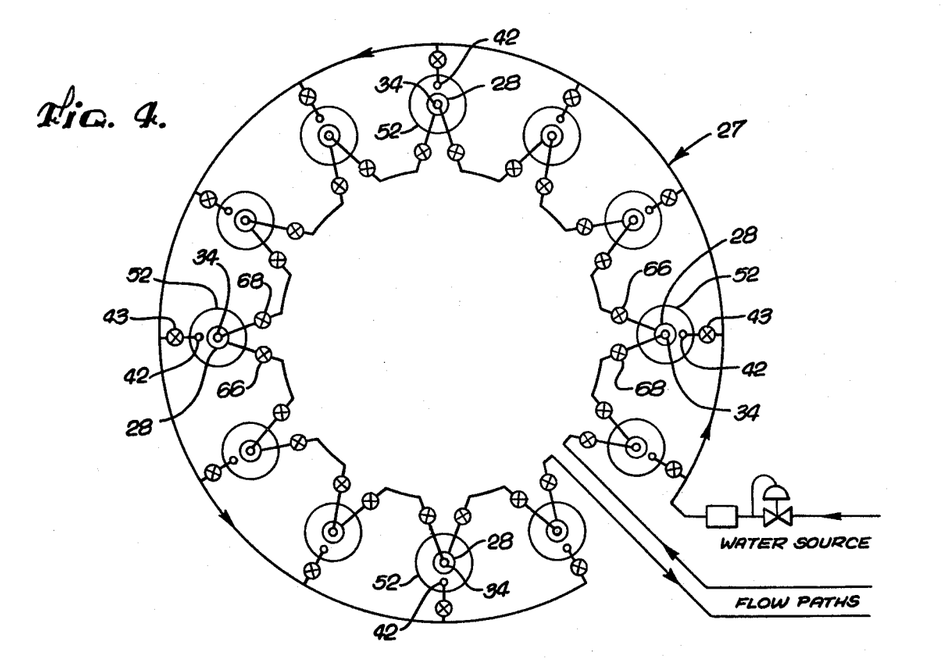
FIG. 4 is a diagrammatic view of the serial coupling of a point source well array in accordance with this invention.
Figure 5:
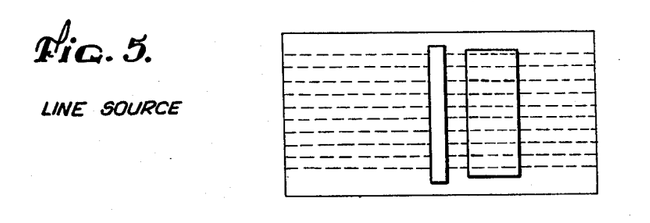
FIG. 5 is a diagrammatic plan view of a line source array in accordance with this invention.
Figure 6:
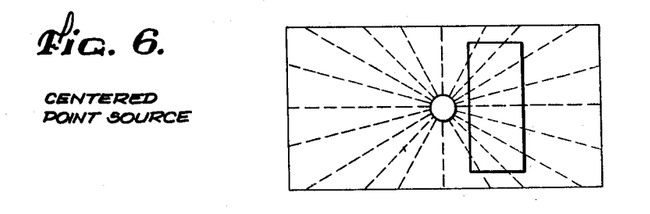
FIG. 6 is a diagrammatic plan view of a centered point source array in accordance with this invention.
Figure 7:
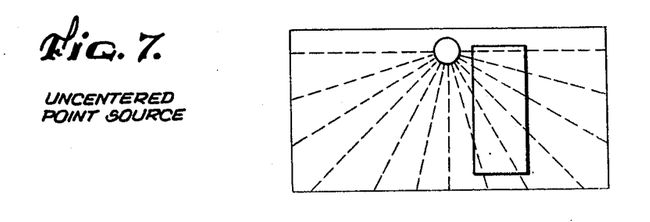
FIG. 7 is a diagrammatic plan view of an eccentric point source array in accordance with this invention.

The earth storage arrangement 10 is best viewed in FIGS. 2, 3 and 4. It comprises an array 27 of wells 26 disposed within the earth, generally at a high angle or an acute angle $\theta$ to the vertical. Typically, $\theta$ is between about 20° to 45°. The angle $\theta$ provides for the spacing and collection of geothermal energy. It allows the depth and volume storage qualities of the earth to be utilized, while the horizontally projected spread of the array limits interference between wells and spreads the vertically directed heat migration of the wells over a greater area. The minimum $\theta$ is determined to avoid significant well intereference, and the maximum $\theta$ is limited by the available lot surface area and the practicality of supporting drilling strings at small angles to the horizontal. Additionally, it is generally not desirable to have any significant portion of the well within about 3 meters from the earth's surface as this region tends to be maintained close to the average ambient temperature. The array may consist of a line source array, shown schematically in FIG. 5, a centered point source array, shown schematically in FIG. 6 or an uncentered point source array, shown schematically in FIG. 7. It should also be recognized that in some arrangements, trenches may be made in the earth, and conduit may be placed horizontally in the trenches.

An outer tube or longitudinal conduit 28 is disposed centrally within the well 26. The outer tube 28 has an outer surface 30 and an inner surface 32. An inner tube or longitudinal conduit 34 is disposed within the outer tube 28 and concentric therewith. A lower portion of the outer tube 28 is spaced apart somewhat from the bottom of the well 26. At the bottom of the outer tube 28, a check valve 36 or one way valve allows flow only from pressure exerted from outside the tube 28 but not down and out the tube 28. This check valve 36 aids in constructing the well 26, yet when in operation, prevents escape of fluid. The inner tube 34 and the outer tube 28 provide a flow path for passing fluid actively through the well 26. A transfer region 38 between the check valve 36 and the bottom of the inner tube 28 provides for a return flow path from one of the tubes 28, 34 to the other. It may be desirable to plug the check valve 36 after construction to avoid reverse flow to the system. This could possibly occur if the flow of thermal transport fluid were stopped, creating greater pressure outside of the conduit. A heavier check valve ball may also be utilized to avoid this problem.

A particulate volumetric mass 39 surrounds the outer surface 30 of the outer tube 28. The particulate volumetric mass 39 is typically gravel or a combination of sand and gravel. At the outer surface of the well 26, a substantially moisture impervious integrated interface 40 exists and the particulate volumetric mass 39 extends adjacent the interface 40. The interface 40 comprises platelets of clay such as bentonite. This results from the clay based drilling fluids which are used in the construction of the wells 26. The interface may also consist, to various extent of the following materials, such as lignins tannins, lignosulfonates, sodium carboxymethycellulose and acrylonitrile, which act as thinners for the clay drilling fluids. These compounds are selected to help build a structural filter cake against the rock face of the earth. Over a period of time, platelets impact against the rock face, enhancing the structural integrity of the well 26, during its construction, and build a semipermeable wall preventing significant loss of moisture from the well 26 when in operation.

An apertured conduit or pipe 42 having spaced apart slots or apertures 44 is disposed within the well adjacent the outer tube 28. The apertured pipe 42 provides a means of moisturizing the particulate mass 39 to maintain thermal conduction between the outer conduit 28 and the surrounding earth rather than allow air filed gaps, which would otherwise result in solely thermal radiation and high thermal resistance. A valve 43 ports domestic water source to the apertured pipe 42, and a pressure controller 45 coupled to the valve 43 maintains a constant but limited pressure to the particulate mass 39.

Figure 8:
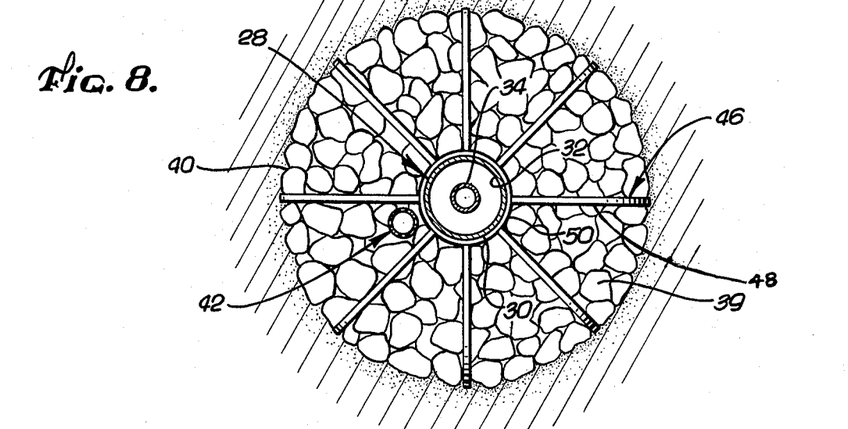
FIG. 8 is a cross-sectional detail view of the well in accordance with this invention taken along lines 8—8 of FIG. 3.

To maintain the inner and outer tubes 28, 34 within the center of the well, centralizers 46, as best viewed in FIGS. 3 and 8, are spaced apart on the exterior of the tubes. The centralizers 46 have a plurality of semi-circular fingers 48 extending radially between and coupled to a pair of spaced apart central hubs 50 to maintain the tubes 28 in position during construction of the wells 26.

A surface pipe 52 is disposed on an upper portion of the well 26, and is surrounded and maintained in place by a surface cement ring 54 which surrounds the surface pipe 52.

Access ports 56 extend outwardly from the surface pipe 52 of the well 26. The access ports 56 permit the expulsion of drilling mud during the process of constructing the well. Water or drilling muds are used as drilling fluids.

The water from the drill string passes on the insides of the drilling pipe and the fluid exits at the access ports 56. With the total depth reached, a water base drilling mud is circulated down the inside of drill pipe and out access ports 56 to stabilize the hole. The drilling mud forms a filter cake 40 and preserves the structural integrity of the hole. The drill string is removed and the outer tube 28 is put in place with centralizer 46 attached. The sand and gravel slurry are then pumped into place.

A cover 58 provides for a closed pressurizable system. It is possible also to use the access pipes 56 as a means for providing moisture to the well center, instead of the apertured pipe 42, though the apertured pipe is preferable. Escape valves 60 are coupled to the access pipes 56 to selectively allow access and removal of fluids and slurries to and from the well 26.

The cover 58 maintains fluid closure of the well 26, and is disposed above the surface pipe 52. The outer tube 28 extends upwardly through the well cover 62 and a coupling pipe 64 extends therefrom, coupled to an access valve 66. The access valve 66 permits flow through the interior of the outer tube 28. The inner tube 34 extends through the upper portion of the outer tube 28 at aperture 67. An access valve 68 is coupled to also permit the flow of the thermal transport fluid.

The valving and serial coupling of the well array or battery 27 of the earth storage arrangement 10 is shown schematically in FIG. 4. A fluid transport flow path is provided by coupling each outer tube 28 of each well 26 to the inner tube 34 of the adjacent well 26. The result is a serial flow path, which in effect enhances the effective length of the well. The fluid flow path so obtained in fixed at any given time in one direction. The temperature of each successive well 26 at a given location tends to vary successively. Thus one of terminal wells of the series is always at a warmest temperature, and the other terminal well 26 of the series battery is always the coldest.

Figure 9:
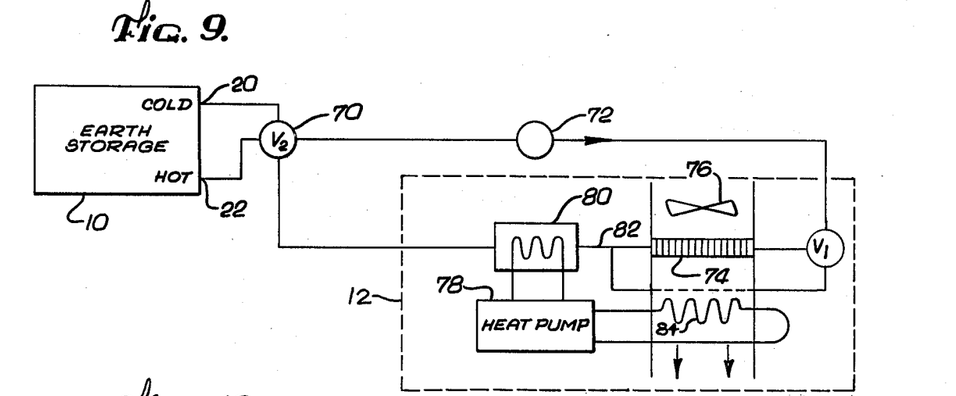
FIG. 9 is a diagrammatic block diagram of a different example of an structural energy system in accordance with this invention.

With particular reference to FIG. 9, an example of a system in accordance with this invention, is also depicted to explain the integral space conditioning aspect of the invention. A control valve 70 (also shown as V2 on FIG. 1) selectively controls the demand for hot and cold tempering fluid. The control valve 70 is coupled to a pump 72 (P2) circulating thermal transport fluid. The control valve 70 is coupled so that it may gate either relatively warm thermal transport fluid, originating from the hot port 22 or colder thermal transport fluid originating from the cold port 20, to pass through and be circulated by the pump 72 though the space conditioning arrangement 12 of the system.

A radiator 74 is serially coupled to the pump 72 so that either warm or cold fluid from the pump passes through the radiator 74. If the transport fluid passing through the radiator 74 is cooler than the ambient room temperature, then the radiator 74 will tend to reduce the room air temperature. If the transport fluid is warmer, then the radiator 74 will tend to increase the room air temperature. A fan 76 is coupled to increase the thermal transfer between the radiator and the ambient air. As the air is either warmed or cooled by the radiator 74, the thermal transport fluid in the radiator 74 is cooled or warmed, respectively by ambient and forced air of the fan 76. This system advantageously utilizes even only moderately warm or cool thermal transport fluid when warmer or cooler than ambient air to raise or lower the room air temperature.

When greater heating or cooling function is required than can be supplied by the fan 76 and the radiator 74, a space conditioning heat pump 78, coupled from a heat exchanger 84 to the ambient air in the vicinity of the radiator 74 to a return heat exchanger 8 coupled to a return fluid conduit 82, provides such enhancement. It should be recognized that the fan 76 is coupled in series with the radiator 74 and the heat exchanger 84. In some configurations, a separate fan may be used for forced convection across the heat exchanger 84. The heat exchanger 80, then can be used to reinforce and enhance the function of the radiator 74, by either aiding in the air heating function or the air cooling function, depending on the operating phase of the system. During cooling cycles, energy is then "transported" from the ambient air to the return heat exchanger 80, to be absorbed by the transport fluid from the return conduit 82. During heating, energy is then "transported" from the transport fluid in the heat exchanger 80 to the ambient air. Since the radiator 74 brings the temperature close to the temperature desired, the heat pump 78 requires the input of only limited energy to drive the air to the desired temperature.

Moreover, since both the exhaust of the heat pump 78 and the radiator 74 passed fluid are combined in the heat exchanger 80, that fluid may become warmer or colder than the temperatures spanned at the ports 20, 22 of the earth storage arrangement 10. The valve 70 may then gate the fluid, depending on the temperature, to either the cold 20 or hot 22 port to thereby store the energy. Thus, if the temperature of the return fluid is greater than the temperature of the hot port 22, the fluid may be gated to the hot port 22, and if less than the temperature of the cold port 20, the return fluid may be gated to the cold port 20. If the temperature is between the temperature of the ports 20, 22 the return fluid may be recirculated through the space conditioning arrangement or may simply be stopped. It should be recognized, of course, that compensation must be made for thermal losses of the transport fluid travelling from the space conditioning loop to the earth storage ports 20, 22.

By using such a space conditioning arrangement 12, a significant component of the cooling and heating energy is developed from the earth storage arrangement 10 and only limited energy need be added, such as by way of work performed by the heat pump 78, pump 72 circulation and by the fan 76, and often that energy, being selectively directed, is available with minimal work expended.

Figure 10:
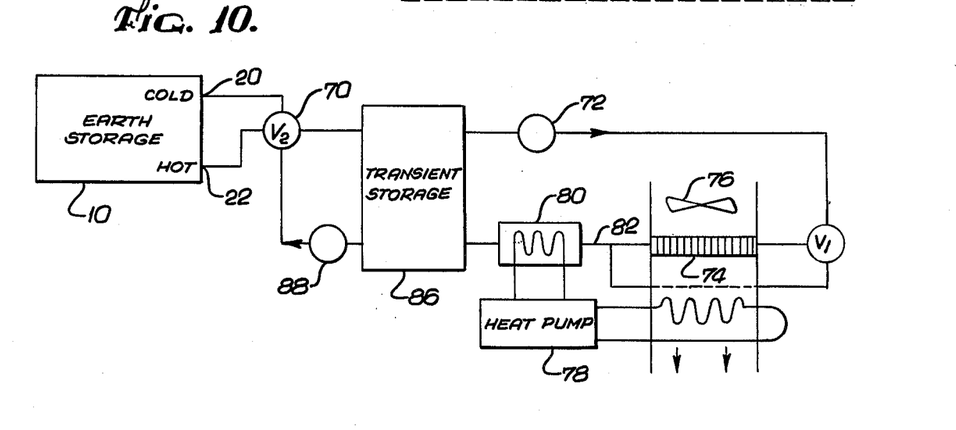
FIG. 10 is a diagrammatic block diagram of a different example of a structural energy system in accordance with this invention.

With particular reference to FIG. 10, a transient storage tank 86 has been added to the system depicted in FIG. 9. The transient storage tank 86 may be typically a unit which is kept within the building structure or residence at least somewhat insulated from the suns rays and from the exterior weather. The transient storage tank 86 is used to temper the extremes of temperature experienced during a day to minimize the number of wells 26 needed in the earth storage array 27 and enhance the effectiveness of the earth storage array 27.

The transient storage tank 86 is coupled to receive the transport fluid from the valve 70 and supply fluid to the pump 72. In addition, the transient storage tank 86 is coupled to receive return fluid from the heat exchanger 80. A second pump 88 is provided to deliver fluid from the transient storage unit to the control valve 70, to either recirculate transport fluid to the storage tank 86 or return fluid to the hot or cold ports 20, 22 of the earth storage arrangement 10.

It should be recognized that while the use of the heat pump 78 in conjunction with the radiator 74 is generally desirable, it is also possible to provide systems not using a heat pump 78 in certain applications, primarily because of the capital cost.

Referring again to FIG. 1, the control valve, 70 (V2) (as in FIG. 9) controls the demand for hot and cold thermal transport fluid. And as in FIGS. 9 and 10, a radiator 74, fan 76, heat pump 78 and heat exchanger 80 are combined to provide a systems which utilizes moderate temperature differentials between the thermal transport fluid and the ambient temperature to condition the temperatures of the structure.

A valve 90 (V1) couples the pump 72 to the radiator and may be gated to bypass the radiator 74 when use of the radiator is not desired. A valve 92 (V4) couples the valve V2 to the transient storage tank 86 to deliver transport fluid to the transient storage tank 86. A secondary exchanger such as a solar collector 94 is coupled to the transient storage tank 86 to enhance the heat storage of the tank 86. The valve 92 may gate the thermal transport fluid to the collector 94, or bypass the collector 94 and deliver the thermal transport fluid directly to the storage tank 86.

The second pump 88 couples the storage tank to the control valve 70 to direct fluid from the transient storage tank 86, which is then directed as appropriate, to the hot port 22 or the cold port 20. Typically, the pump 88 is maintained in an "always on" state, while pump 72 (#1), typically larger in capacity than pump 88, is only on call intermittently when air space heating or cooling is required. The pump 72 moves the thermal transport fluid in the direction indicated from the transient storage tank 86 to the radiator 74.

The example depicted in FIG. 1 also is integrally coupled with the water heating arrangement 14. The water heating arrangement 14 includes the hot water heater 16, the hot water preheater 18 and a heat pump 95. The hot water heater 16 has a heat exchange coil 96 and a heat exchange coil 98 disposed therein. The hot water preheater 16 comprises a tank having a heat exchange coil 100 coupled to the domestic water source 19, while the tank is in fluid communicating relationship with the hot port 22 of the earth storage arrangement 10. The tap water may be preheated or initially warmed by thermal exchange from the earth storage arrangement 10, before greater heating takes place in the hot water heater 16. A valve 102 (V3) couples the tank of the preheater 18 and thus the thermal transport fluid to the coil 98 so that on demand when required for space heating, warmer thermal transport fluid will be available for the space conditioning arrangement 12, effectively increasing the capacity of the space conditioning heat pump 78. Normally, the valve 102 (V3) causes the thermal transport fluid to short circuit the coil 98 bypassing the hot water heater 16 entirely.

Figure 11:
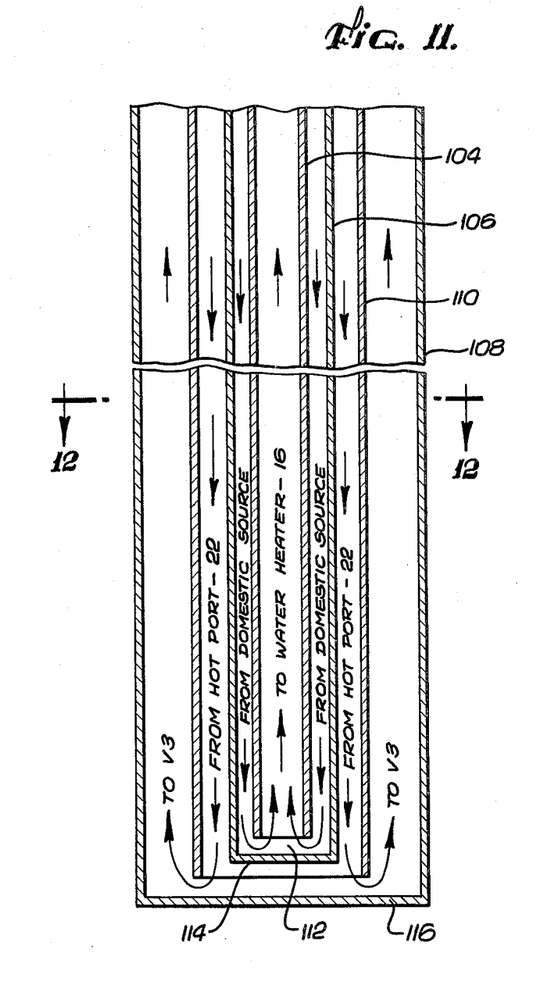
FIG. 11 is a diagrammatic perspective view of a portion of a preheater in accordance with this invention.
Figure 12:
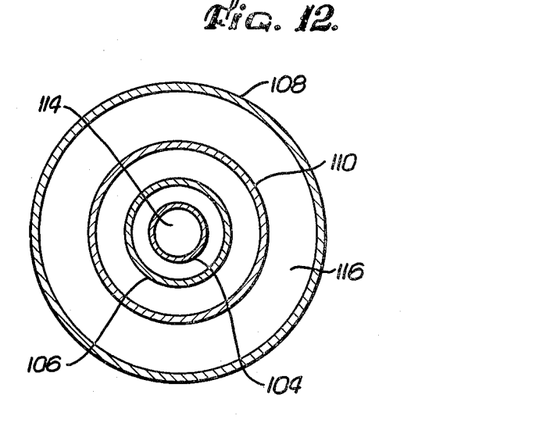
FIG. 12 is a cross-sectional view of the preheater taken along lines 12—12 of FIG. 11.

Another example of a preheater 18 for use in connection with this invention is depicted in FIGS. 11 and 12. The preheater 18 comprises four concentric conduit. An innermost conduit 104, typically $\frac{1}{2}$" to $\frac{3}{4}$" (1.3 cm. to 2 cm.) diameter is surrounded by a conduit 106, typically 1¼ inch to 1½ inch (3.2 cm. to 3.8 cm.), and an outermost conduit 108, typically 3 inch to 5 inch (7.6 to 13 cm) diameter surrounds a conduit 110, typically 2 inches to 3 inches (5.1 cm. to 7.6 cm.) diameter, which in turn surrounds the conduit 106. The conduit 104 and conduit 106 are coupled in fluid communicating relationship by a plenum region 112, typically formed by an end cap 114 on the larger conduit 106, and by spacing the conduit 104 from the end cap 114. Remote from the end cap 114, the innermost conduit is coupled to the hot water heater 16. Remote from the end cap 114, the conduit 106 is coupled to the domestic water source 19. The conduit 110 also has an end cap 116, and remote from the end cap 106, this conduit 110 is coupled to the hot port 22 of the earth storage arrangement 10. Similarly, conduit 108 is spaced apart from end cap 116 and is coupled to the valve 104 remote from the end cap 116. This provides for most immediate thermal transfer between the earth storage arrangement thermal transport fluid and domestic source water entering the water heater 16.

The heat pump 95 is coupled to a coil 116 in the heat exchanger 24. The heat exchanger 24 has a tank coupled in fluid communicating relationship to the cold port 20 of of the earth storage arrangement 10. The heat pump 95 when operating tends to transfer heat from the heat exchanger 24 to the hot water heater 16, thus reducing the temperature of thermal transport fluid in the heat exchanger 24 and at the same time heating the water in the hot water heater 16. The cooler thermal transport fluid may be stored in the earth storage arrangement 10, or may be used for other aspects of the system such as space cooling.

It should be understand that the function of cooling or heating depends on the particular temperature of the air at any given time, the temperature of the thermal transport fluid in the transient storage tank 86 and the temperature differentials. It should be kept in mind that limited energy is required to raise or lower temperatures only a few degrees, and even a small differential in temperatures between the interior ambient air and the thermal transfer fluid may be utilized in accordance with this invention to drive the air temperature to a desired comfort level. The system functions even when the temperature difference is in the wrong direction. Thus, the system can cool a house when the thermal transport fluid is hotter than ambient air. The heat pump 94, generally requiring significant capital outlay, does allow a reduction in the size of the space heating heat pump 78. In some installations, the heat pump 78 may be eliminated entirely, depending on the tradeoffs of power saving and capital costs.

Figure 13:
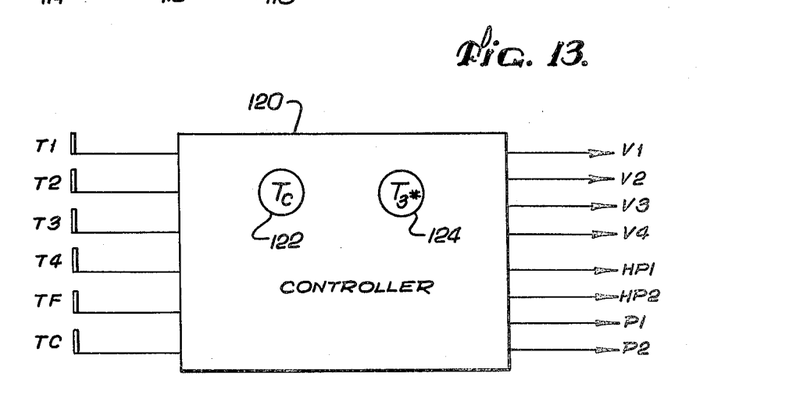
FIG. 13 is a diagrammatic view of a controller in accordance with the invention.

The system is operated by a controller 120, as depicted in FIG. 13. The controller 120 comprises a plurality of temperature sensors disposed within the system and coupled to determine the controller 120 output conditions. Sensor T1 is disposed in thermal communication with the cold port 20. Sensor T2 is disposed in thermal communication with the fluid at the hot port 22. Sensor T3 is disposed within the hot water heater 16. Sensor T4 is disposed in thermal communication with the secondary collector 94. Sensor TF is disposed in thermal communication with the thermal transfer fluid leaving the transient storage tank 86, and entering the space conditioning system 12. Sensor Tc is disposed within the building structure to measure the ambient air temperature. A settable air temperature control 122 allows the air temperature of the building or residential structure to be driven to the temperature set and a settable water temperature control 124 allows the water heater 16 temperature to be driven to the temperature thereby set.

The controller 120 includes switching circuits, typically solid state relays, separately coupled to the valves V2, V3 and V4 and coupled to the four way control valve V1. Additionally, the controller 120 is coupled to selectively and separately actuate the heat pumps 78 (HP1) and 95 (HP2), and the pumps 72 (P1), 88 (P2). These components of the system are actuated by the controller 120 in response to the condition of the temperature sensors T1, T2, T3, T4, TF and Tc, and the setting of the settable controls 122, 124.

Figure 14:
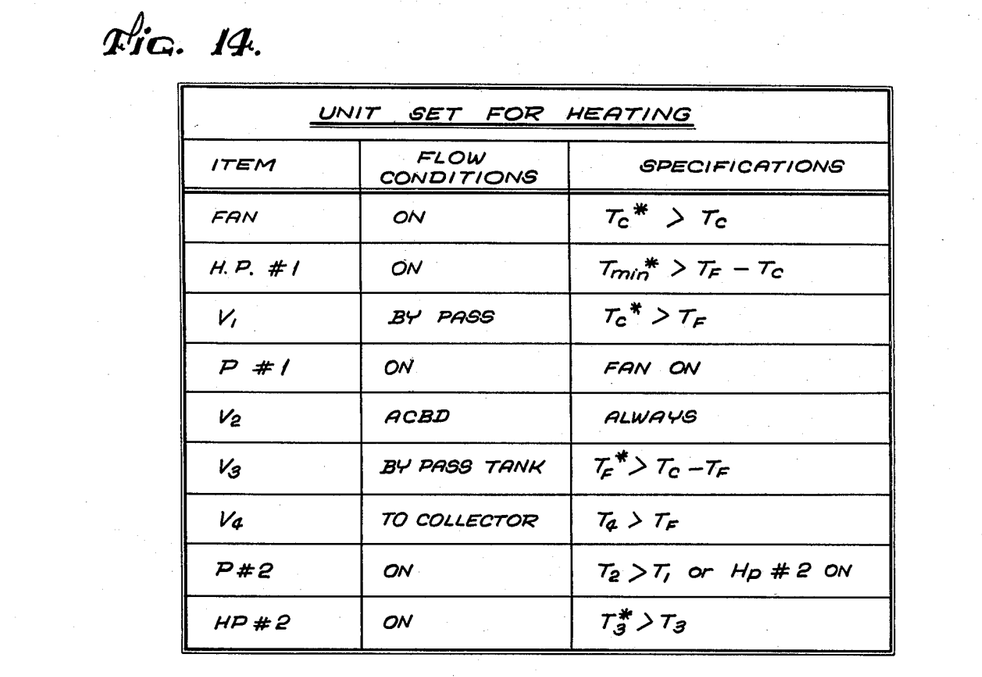
FIG. 14 is a logic chart depicting conditions and states of the controller of FIG. 13 in a heating mode, in accordance with this invention.
Figure 15:
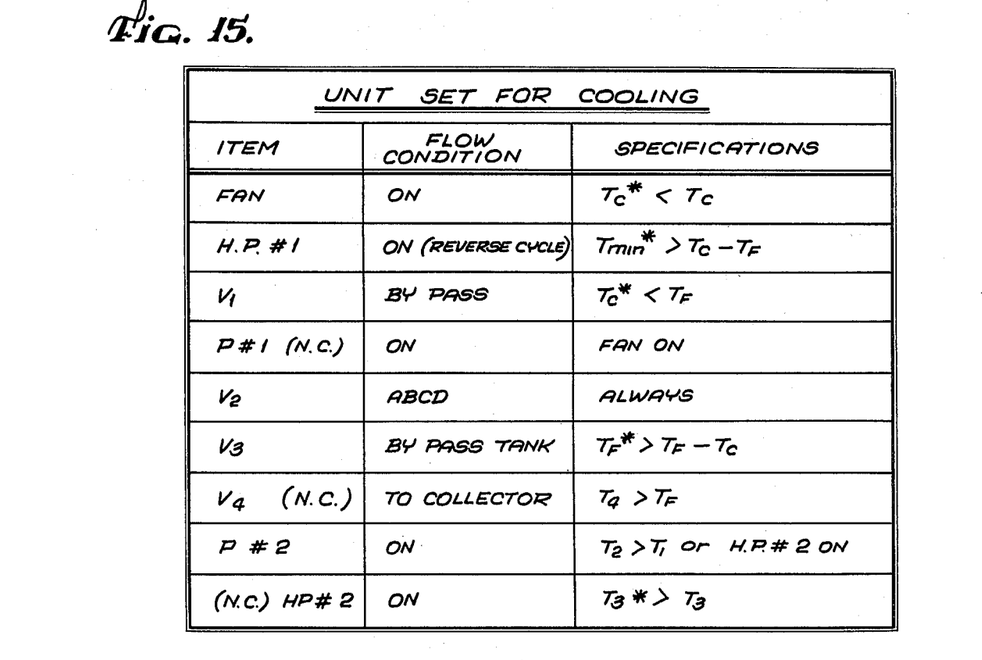
FIG. 15 is a logic chart depicting conditions and states of the controller of FIG. 13 in a cooling mode in accordance with this invention.

With particular reference to FIGS. 13, 14 and 15, an asterisk represents a specified level sought to be reached by the system, while the absence of an asterisk represents a temperature value sensed by the sensors. In addition, the following definitions and conventions are used:

T1 = Thermal transport fluid temperature at cold port 20

T2 = Thermal transport fluid temperature at hot port 22

T3 = Temperature of water inside hot water heater 16

T3* = Hot water temperature setting (on control 124) for water heater 16 (about 140° F. (60° C.))

T4 = Temperature of thermal transport fluid in secondary collector 94

TF = Temperature of thermal transport fluid leaving transient storage tank

Tc = Temperature of air measured within the building structure

TF* = Setting of maximum temperature difference (between essentially the transport fluid temperature in the transient storage tank 86 and the ambient air) allowable by the space conditioning arrangement 12. Note that this is typically a setting made within the system, not generally adjustable by the user. This is also a method of eliminating the need for measuring air temperature. Here the valve 102 (V3) must be controlled. The direct method would be that of measuring the air temperature downstream of the exchange coil 84 connected to the heat pump 78. The alternative would be to determine at what temperature difference between TF and Tc the space conditioning unit 12 will operate (i.e. without the necessity of pulling in hot water from the water heater 16, and thus aided by the hot water heat pump 95). By way of example, in a space heating mode, the unit 12 may need a fluid that is not less than, for example 30° F. (17° C.) cooler than the ambient air, Tc. The valve 102 (V3) would then collect heat from the hot water heater through the coil 98 when TF plus 30° F. (17° C.) is less than Tc. If the house air temperature is set at 78° F. (26° C.), i.e. Tc* = 78° F., then the valve 102 (V3) would pass fluid through coil 98 when the transfer fluid temperature TF would drop below 48° F. (9° C.).

Tc* = Air temperature setting (control 122) within structure

Tmin* = Minimum operational temperature difference of radiator 74. The purpose of this setting is to know when the heat pump 78 must be used. This determination may be made by direct measurement of air leaving the radiator 74. Alternatively, a determination may be made of the temperature difference which would not provide sufficiently warm transport fluid. Thus, the heat pump 78 is keyed to the fluid temperature. By way of example, in a heating mode, the radiator 74 may be designed to require a 20° F. temperature difference to conduct the design heat rates. The heat pump 78 then is actuated when TF − 20° F. is less than Tc. This eliminates the necessity of measuring the air temperature within the space heating arrangement 12.

V1 — Bypass valve 90 for radiator 74

V2 — Four way valve 70 to change direction of flow down wells array 27

V3 — Hot water bypass valve

V4 — Bypass valve 92 for secondary collector 94

HP1 — Space heating heat pump 78

HP2 — Water heating heat pump 95

P1 — Pump 72 to space heating heat pump 78 (HP1)

P2 — Pump 88 to well array 27

Under normal operation, domestic water is preheated by the thermal transport fluid in the preheater 18, rather than by the heat pump 95. The transport fluid bypasses the hot water heater 16. When requirements exceed the space heating heat pump capabilities, the transport fluid is passed through an exchanger coil 98 within the hot water heater 16. The source water temperature is then increased thus increasing the capacity of the first heat pump 78, when in a heating mode.

In the heating mode, when TF > Tmin + Tc, then fluid passes through the radiator 74 and the heat pump 78 does not operate.

When Tmin + Tc > TF, and TF > Tc, fluid passes through the radiator 74, allowing conduction to heat the air. The heat pump then operates to supply the rest of the energy. Heat pump operating efficiency is high due to air temperature and fluid temperature being almost equal. This also reduces the thermal transport requirements of the heat pump 78 thus producing a high system efficiency.

When Tc > TF, the radiator 74 is bypassed and the heat pump 78 does all the work. The fan 76 being in series, may be used to drive the air across the heat exchanger 84. The long term storage and this part time use of the heat pump 78 are what produces very high seasonal system efficiency. The listed functions reverse for cooling the structure. The thermal transfer fluid is typically a water base medium treated to reduce freezing temperature and corrosion problems. It may be similar to antifreeze currently in use in automobiles. It may be tagged with a coloring to detect possible leakage.

With specific reference to FIGS. 14 and 15, it may be seen that the fan 76 is on when the air temperature Tc is less than the air temperature sought, Tc*, in the heating mode and more than the air temperature sought in the cooling mode. The heat pump 78 (HP1) is on in the heating mode when the minimum temperature difference is greater than the temperature of the transport fluid leaving the transient storage tank 86 less the current air temperature. Thus when the temperature differential is not sufficiently high, the heat pump 78 is activated. Similarly in the cooling mode, the heat pump 78 is activated, though in the reverse cycle, when the minimum temperature difference also is not exceeded, but the temperature difference is in the opposite direction than in the heating mode.

Valve 90 (V1) is in the bypass mode when the desired air temperature is greater than the temperature of transport fluid leaving the transient storage tank 86, in the heating mode, and in the cooling mode, when the air temperature is less than the temperature of the transport fluid leaving the transient storage tank 86. Pump 72 (#1) is always on when the fan 76 is on.

In the heating mode, control valve 70 (V2) causes transport fluid flow from the transient storage 86 to the heat exchanger 24 through path AC. In this mode, the resulting cooler fluid resulting from space heating is allowed to flow back into the cold port 20 of the earth storage arrangement 10. Also, the path BD is open, allowing transfer fluid from the hot port 22 of the earth storage arrangement 10 to flow to the transient storage tank 86.

In the cooling mode, the control valve 70 (V2) is gated so that flow paths AB and CD are open. In this arrangement, thermal transport fluid from the transient storage tank 86 flows through the control valve 70 back toward the hot port 22 of the earth storage arrangement 10 via path AB. Cool transport fluid from the cold port 20 of the earth storage arrangement 10 can then flow through the control valve 70 to the transient storage tank 86 in path CD.

Valve 102 (V3), when in a heating mode, is coupled to cause the thermal transport fluid to bypass the hot water heater 16 when the desired maximum temperature difference is less than the difference between the air and transient storage tank 86 exit temperature, and in the cooling mode when the desired maximum temperature difference is less than the difference between the air and transient storage tank 86 exit temperatures TF, but again the temperature difference is in the opposite direction.

Valve 92 (V4) causes the thermal transport fluid to be gated to the collector 94 when the transfer fluid temperature in the secondary collector 94 is greater than the temperature of the transfer fluid leaving the transient storage tank 86, whether in the heating or cooling modes.

The pump 88 (P2) is on when the hot port 22 temperature is greater than the cold port temperature (generally always), or the heat pump 95 (HP2) is on. The heat pump 95 (HP2) is on when the temperature setting for the hot water heater 16 is greater than the temperature of the hot water heater 16. These conditions for P2 and HP2 are for both heating and cooling modes.

Figure 16:
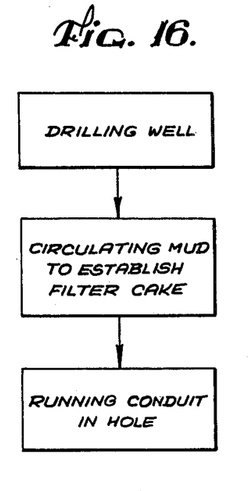
FIG. 16 is a block diagram of a method for making thermal storage wells in accordance with this invention.

Another aspect of this invention is the construction of wells 26 for the well battery or array 27. The ability of the wells to function depends on economics of drilling, materials and maintenance. This construction provides a thick cake structure 40, integrated with the rock wall which is only semi-moisture permeable, and highly conductive intermediate packing 39 which allows for relatively small diameter piping, thus, minimizing costs of construction. Practices in the petroleum drilling field are adaptable to the techniques described.

Initially, a shallow surface hole is drilled with a dry auger bit similar to that used for fence post digging. This initial drilling is at a high angle, that is, at an acute angle to the vertical. The angle allows significant usage of the area earth space for storage. Interference between wells is also reduced and geothermal energy radiating outward from the earth is collected. A surface pipe is then placed in the hole, and the surface pipe is cemented in place, forming a cement ring.

A drilling string including a small diameter drill pipe is run into the hole at the initial drilling angle. The drilling string includes an ordinary tri-conical rotary drilling bit, a near bit stabilizer to provide support for the string, a drill collar adjacent the stabilizer for providing greater support, a string type stabilizer and drill pipe. The stabilizers maintain the initial hole angle $\theta$. Drilling continues to the total depth of the well, while rotating the drilling pipe and circulating fluid down the center of the drilling pipe and up the exterior of the well. Pumps are coupled to the access ports 56 to drive the drilling fluids and mud down the well. A tank of sufficient size to allow all drilling solids to fall to the bottom is used in conjunction with the pump. A drilling rig capable of lifting, rotating and lowering the outer tube 28 is coupled to the drill string. Water base drilling fluids are used such as bentonite. Filtration control is accomplished by organic thinners such as lignins, tannins and lignosulfonates, or sodium carboxymethylcellulose, or acrylonitrile, as determined by the economics of these compounds. The drill string is pulled up about 2 feet (61 cm.) Water based drilling muds are circulated to stabilize the hole.

Figure 17:
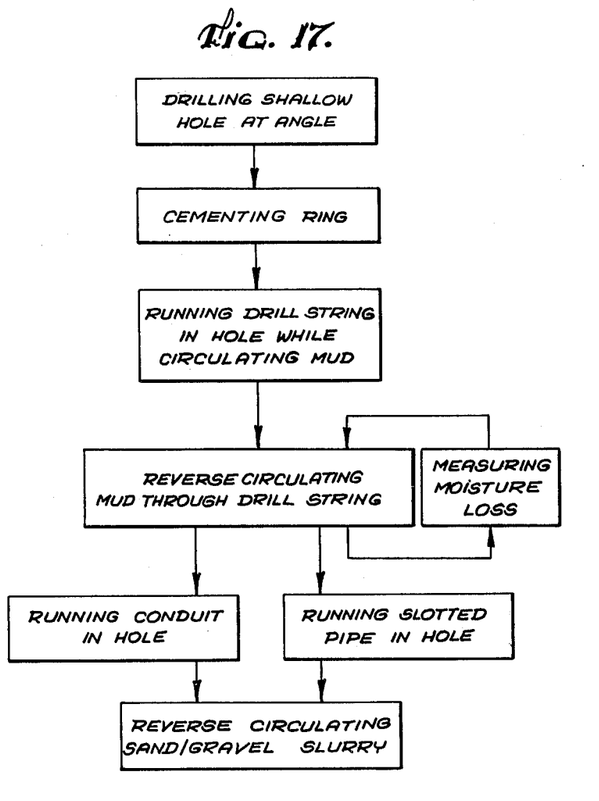
FIG. 17 is a block diagram of the method depicted in FIG. 16.

The drill string is then pulled out of the hole, while the hole is filled with mud. As best viewed in FIGS. 3 and 8, centralizers 46 are placed on the outside of the outer tube 28, for example at intervals to maintain centrality of the outer tube 28 within the well 26. The outer tube 28 is then run in the hole. The apertured pipe 42 is also run in the hole.

Water base drilling mud is reverse circulated down the outside of the outer tube 28 and up the center of the outer tube 28. The drilling mud is pumped through the access ports 56. This results in the build up of a filter cake 40 at the rock bed to provide an integrated interface which is semi-moisture permeable, as a result of platelets which build up against the rock wall. The clay platelets hold the water in, while the sand and gravel mixture and hydrostatic pressure hold the rock face out.

Circulation of the water base drilling mud continues until the fluid loss from the surface pipe is small. The circulation is stopped and fluid loss from the surface pipe is measured. If fluid loss is small, circulation of the drilling mud is discontinued. This fluid loss may be on the order of about a gallon (4 liters) per day. Otherwise the mud circulation is resumed.

This is followed by a mixing of sand/gravel slurry with drilling mud. This slurry is reverse circulated, through the access ports. While the fluid components may return through the outer tube 28, the gravel particulates at low pump rates will fall out in the well 26. In addition, the pump rates of the slurry are sufficiently small so as not to carry gravel/sand up the center of the outer tube 28.

Figure 18:
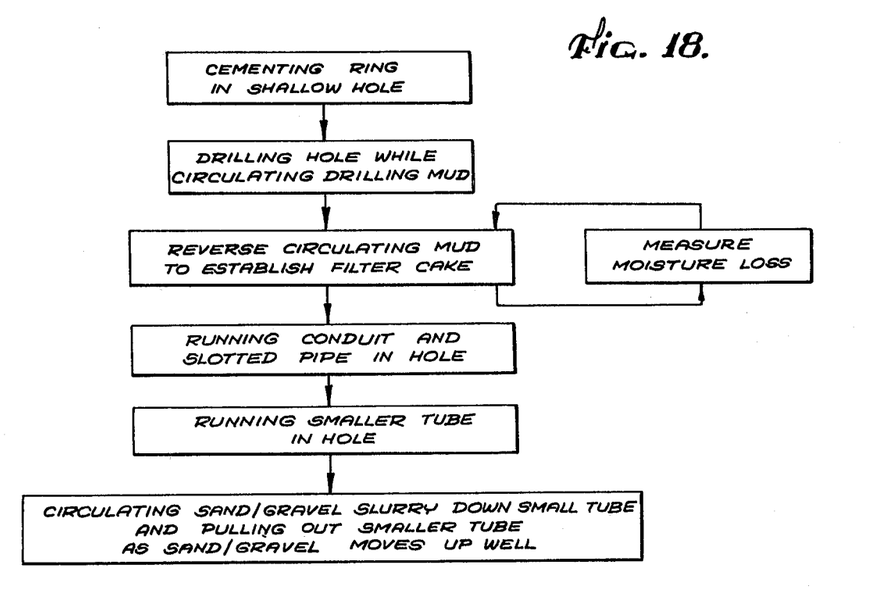
FIG. 18 is a block diagram of another example of a method for making a thermal storage well in accordance with this invention.

An alternative example for the process is useful where high pressures are encountered in ports 56. A second small diameter tube is lowered into the well 26 outside of the outer tube 28 to the top of the level of sand/gravel in the well. The slurry is then pumped down the well through the small diameter tube, but now the fluid returns through the port 56. The new tube is pulled from the well as the level of the sand/gravel moves up the well. Following the packing of the outer tube the inner tube 34 is lowered inside of the outer tube 28 into the well.

While the invention has been particularly shown and described with reference to preferred examples thereof, it will be understood by those skilled in the art that various changes in form and details may be made therein without departing from the spirit and scope of the invention.

What is claimed is:

1. An earth coupled structural energy system comprising:
    an energy distribution system for selectively applying thermal energy within a building structure;
    earth storage means for communicating thermal energy with the earth, the earth storage means having a substantially moisture impervious integrated earth interface, thereby maintaining substantial thermal conductive moisture within the earth storage means, yet providing conduction to the earth at the integrated earth interface, the integrated earth interface generally defining an earth interface surface area;
    fluid transport means disposed within the earth storage means for circulating a thermal transfer fluid through the earth storage means;
    the fluid transport means having an interface with the earth storage means, the fluid transport means interface defining a surface surrounded in spaced-apart relationship to the earth interface surface area;
    means for maintaining a high thermal conductivity at the fluid transport means interface; and
    means for thermally communicating with the thermal transfer fluid to effect thermal changes in the energy distribution system;
    the earth storage means having a high thermal permeability, whereby thermal energy is readily conducted between the earth and the fluid transport means with minimal thermal radiation.

2. The invention as set forth in claim 1 and in which the earth interface surface area is at least twice the area of the fluid transport means interface.

3. The invention as set forth in claim 1 and in which the earth storage means comprises a well defining a well depth;
    the fluid transport means comprises longitudinal first tube means within the well, the first tube means defining an external surface at the fluid transport means interface and a first tube radius at the external surface;
    the earth storage means comprising an intermediate particulate volumetric mass surrounding the first tube means and extending radially to the integrated earth interface.

4. The invention as set forth in claim 3 and in which the integrated earth interface comprises a clay platelet transition.

5. The invention as set forth in claim 4 and in which the tube comprises a one-way valve adjacent the lower extremity of the first tube means.

6. The invention as set forth in claim 4 and in which the means for maintaining high thermal conductivity at the fluid transport interface comprises an apertured longitudinal pipe generally parallel to the first tube means, and means for supplying a liquid to the apertured pipe.

7. The invention as set forth in claim 3 or 6 and comprising means for maintaining a constant liquid pressure on the particulate mass.

8. The invention as set forth in claim 6 and comprising means for maintaining constant liquid pressure on the particulate mass and in which the constant pressure maintaining means are coupled to the apertured longitudinal pipe.

9. The invention as set forth in claim 4 and in which the substantially moisture impervious transition comprises bentonite.

10. The invention as set forth in claim 1 and comprising means for maintaining a constant liquid pressure within a region defined by the earth interface surface area and the fluid transport means interface.

11. An earth coupled structural energy system comprising:
    an energy distribution system for selectively supplying thermal energy within a building structure;
    earth storage means for communicating thermal energy with the earth, the earth storage means having an integrated earth interface generally defining an earth interface surface area, the earth storage means comprising an array of wells disposed within the earth;
    fluid transport means disposed within the earth storage means for circulating a thermal transfer fluid through the earth storage means;
    the fluid transport means comprises longitudinal first tube means within each well, the first tube means defining an external surface at the fluid transport means interface;
    the earth storage means comprising an intermediate particulate volumetric mass surrounding the tube and extending radially to the integrated earth interface;
    the fluid transport means having an interface with the earth storage means, the fluid transport means interface defining a surface of substantially smaller area than the earth interface surface area;
    means for maintaining a high thermal conductivity at the fluid transport means interface; and
    means for thermally communicating with the thermal transfer fluid to effect thermal changes in the energy distribution system;
    the earth storage means having a high thermal permeability, whereby thermal energy is readily conducted between the earth and the fluid transport means with minimum thermal radiation.

12. The invention as set forth in claim 11 and in which the integrated earth interface comprises a substantially moisture impervious clay platelet transition, thereby maintaining substantial thermal conductive moisture within the earth storage means, yet providing thermal conduction to the earth at the integrated interface.

13. The invention as set forth in claim 12 and in which the tube comprises a first flow path central to the tube and a second flow path exterior to the first flow path, the first and second flow paths coupled serially to one another remote from the earth surface.

14. The invention as set forth in claim 13 and in which the means providing the second flow path comprises an inner tube means concentric with the first tube means.

15. The invention as set forth in claim 14 and in which the first tube means has a lower region and the invention comprises a one way valve adjacent the lower region of the first tube means.

16. The invention as set forth in claim 14 and in which the means for maintaining high thermal conductivity at the fluid transport interface comprises an apertured longitudinal pipe generally parallel to the first tube means, and means for supplying a liquid to the apertured pipe.

17. The invention as set forth in claim 16 and comprising means for maintaining a constant liquid pressure on the particulate mass.

18. The invention as set forth in claim 14 and in which the fluid transport means comprises a first port and a second port, each tube means within each well being coupled in series, the first port being coupled to the first flow path of one tube and the second port being coupled to the second flow path of the other tube, whereby the entire array may provide an enhanced length flow path.

19. The invention as set forth in claim 18 and in which the array comprises a line source array.

20. The invention as set forth in claim 18 and in which the array comprises a centered point source.

21. The invention as set forth in claim 18 and in which the array comprises an uncentered point source.

22. The invention as set forth in claims 18, 19, 20 or 21 and comprising means for circulating fluid in the fluid transport means array in a first direction and in a second direction, in response to demands for fluids of higher and lower temperatures.

23. The invention as set forth in claim 12, 13, 14, 15, 16, 18, 19, 20 or 21 and in which the integrated earth interface comprises bentonite clays.

24. The invention as set forth in claim 12, 13, 14, 15, 16, 18, 19, 20 or 21 and in which the integrated earth interface comprises clay and a thinner selected from the group consisting of lignites, tannins and lignosulfonates.

25. The invention as set forth in claim 12, 13, 14, 15, 16, 18, 19, 20 or 21 and in which the integrated earth interface comprises clay and polymers selected from the group consisting acrylic polymers and sodium carboxymethylcellulose.

26. An earth coupled thermal storage arrangement comprising:
a generally longitudinal well defining a well depth and having a substantially moisture impervious integrated earth interface generally defining an earth interface surface area;
fluid transport means for communicating thermal energy with the earth, comprising first conduit means for circulating a thermal transport fluid and thermally communicating with the earth, the first conduit means disposed within the substantial depth of the well and having an end defining an interior region, and second conduit means for circulating thermal transport fluid to and from the first conduit means, the second conduit means disposed within the first conduit means;
the first conduit means surrounded by an intermediate volumetric particulate mass comprising a sand/gravel mixture; and
means for maintaining moisture within the particulate mass at the fluid transport means interface.

27. The invention as set forth in claim 26 and comprising means coupled to the first conduit means adjacent the interior region of the end to allow slurry fluid to be pumped upwardly through the conduit during the placement of the sand/gravel mixture in the well during well construction, yet preventing the escape of heat transfer fluid from the first conduit means, when in use.

28. The invention as set forth in claim 27 and in which the moisture maintaining means comprises third conduit means external to the first conduit means, disposed longitudinally within the well.

29. The invention as set forth in claim 28 and in which:
the third conduit means comprises a slotted pipe; and
the arrangement further comprises
a plurality of spaced apart centralizers disposed in spaced apart relationship along the first conduit means, the first conduit means defining a circumference, each centralizer comprising a pair of spaced apart annular hubs engaging the circumference of the first conduit means, and a plurality of convex spokes extending between each hub pair to thereby maintain the first conduit means generally centrally within the well during construction.

30. The invention as set forth in claim 29 and comprising:
a shallow pipe within the well adjacent the earth surface and a cement ring surrounding the shallow pipe;
means disposed adjacent the shallow pipe for porting a slurry to and from the well during well construction;
inlet and outlet means for porting a thermal transfer fluid through the first and second conduit means; and
the means coupled to the first conduit means comprises a check valve.

31. The invention as set forth in claim 26, 27, 28, 29 or 30 and in which the well diameter is greater than twice the diameter of the first conduit means.

32. The invention as set forth in claim 26, 27, 28, 29 or 30 and in which the integrated earth interface has an inner diameter greater than twice the diameter of the first conduit means and the integrated earth interface comprises bentonite.

33. The invention as set forth in claim 26, 27, 28, 29 or 30 and in which the integrated earth interface has a diameter greater than twice the diameter of the first conduit means and the integrated earth interface comprises a bentonite clay and a thinner selected from the group consisting of lignites, tannins and lignosulfonates.

34. The process for constructing a thermal storage well, comprising the steps of:
drilling a shallow surface hole with a dry auger bit at an angle to the vertical;
placing surface pipe in the hole;
cementing the surface string to the surface;
running in hole a drilling string;
drilling to a well depth, while rotating pipe and circulating fluid down the center of the pipe and up the exterior;
pulling up from the hole a short distance to allow the circulation of mud;
circulating water base drilling mud to stabilize the hole;

pulling out of the hole the drilling string, while filling the hole with mud;
running in hole an outer tube with centralizers;
running in hole a slotted pipe;
circulating down outside of the outer tube and up center a water base drilling mud;
stopping the circulation and measuring the fluid loss from the surface pipe and continuing until fluid loss is small;
mixing gravel and sand slurry with a drilling mud; and
reverse circulating the slurry down the well to pack the space between the outer tube and the rock face, at a slow rate.

35. The process for constructing a thermal storage well comprising the steps of:
drilling a well;
circulating mud through the hole to establish a filter cake;
running a thermal transfer conduit in the hole;
running a drill string within the hole while circulating mud;
measuring moisture loss from the well; and
reverse circulating a sand/gravel slurry through the thermal transfer conduit to establish an intermediate particulate mass extending adjacent to the filter cake.

36. The process as set forth in claim 35 and in which the thermal transfer conduit has an outer circumference less than one-half the circumference of the filter cake.

37. The process as set forth in claim 36 and comprising the steps of:
drilling an initial shallow hole at an angle;
cementing a surface pipe in the shallow hole.

38. The process as set forth in claim 36 and comprising the steps of:
running a conduit of smaller diameter than the thermal transfer conduit, in the hole beside the thermal transfer conduit; and
pulling out the smaller conduit as the sand/gravel slurry moves up the well.

39. The invention as set forth in claim 38 and comprising the steps of:
running a drill string within the hole, while circulating mud; and
measuring moisture loss from the well; and
continuing to circulate drilling mud until moisture loss is at least less than a predetermined rate.

40. The invention as set forth in claim 39 and comprising the steps of:
drilling an initial shallow hole at an angle; and
cementing a surface pipe in the shallow hole.

* * * * *